Nov. 12, 1929.　　　G. W. CURTIS　　　1,735,602
DOUBLE SHEAVE WHEEL
Filed April 2, 1927
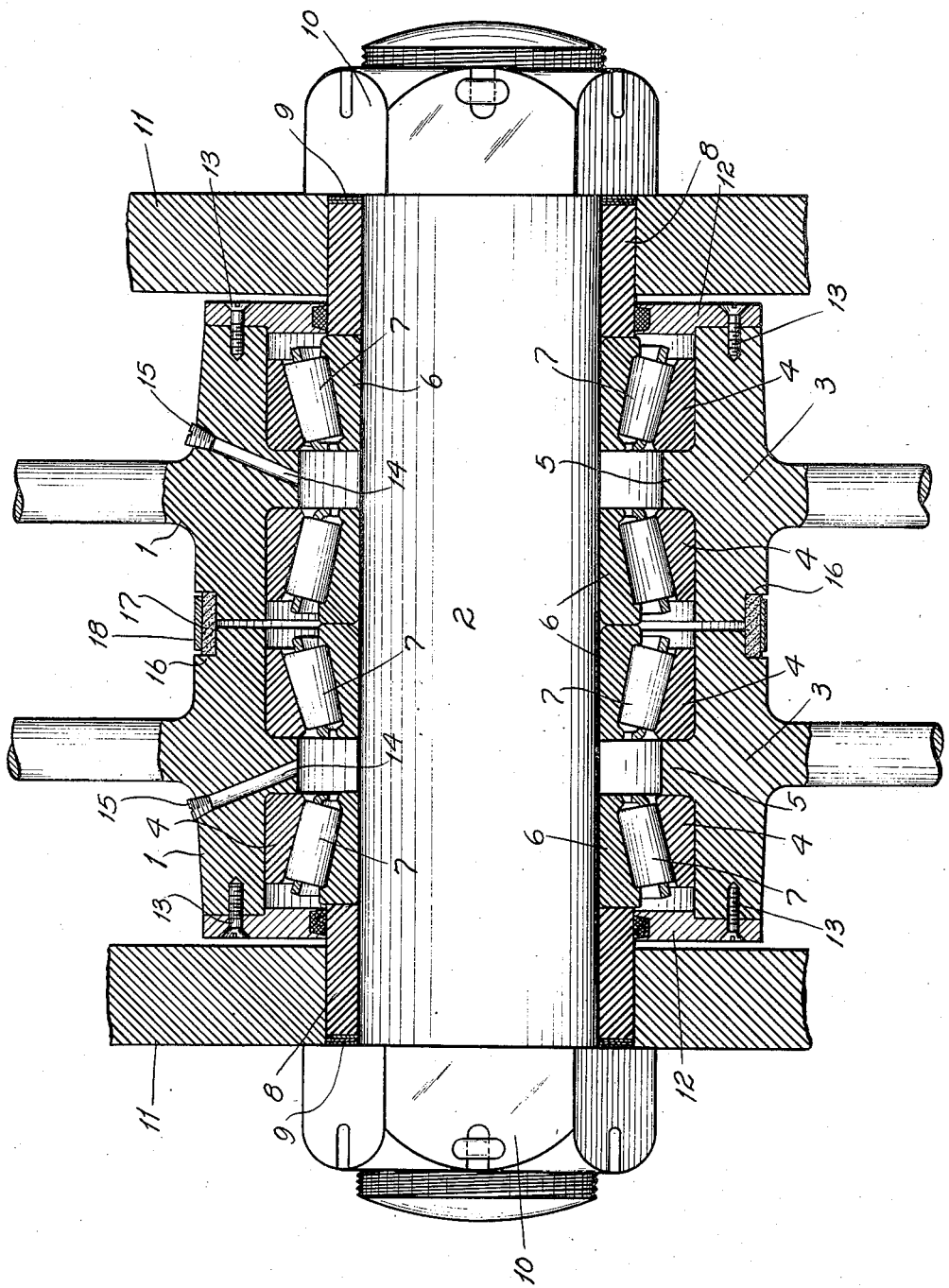
INVENTOR:
George W. Curtis,
by Carr Kan & Gravely,
HIS ATTORNEYS Patented Nov. 12, 1929

1,735,602

UNITED STATES PATENT OFFICE

GEORGE W. CURTIS, OF MILWAUKEE, WISCONSIN, ASSIGNOR TO THE TIMKEN ROLLER BEARING COMPANY, OF CANTON, OHIO, A CORPORATION OF OHIO

DOUBLE SHEAVE WHEEL

Application filed April 2, 1927. Serial No. 180,435.

My invention relates to sheave wheels and has for its principal object a construction in which two or more sheave wheels may be placed in close proximity to each other on a shaft or pivot pin and mounted on roller bearings, in such a way that the over-all length of the pivot member may be kept down. Where roller bearings are used in sheave wheels it is necessary to maintain a supply of lubricant in the bearings; and constructions now commonly used space the sheave wheels apart and use rather bulky closure devices. The present invention consists principally in a lubricant seal for the abutting hubs of double sheave wheels and the like that is simple and compact, whereby the wheels may be placed in close proximity to each other and the over-all length of their pivot pin kept within reasonable limits. The invention further consists in the sheave wheel construction and in the parts and combinations and arrangements of parts hereinafter described and claimed.

The accompanying drawing is a cross-sectional view of the hub portion of a double sheave wheel construction embodying my invention.

The drawing illustrates two sheave wheels 1 mounted on a pivot pin 2. In each end of the hub 3 of each sheave wheel is the cup 4 or outer bearing member of a roller bearing, said cups abutting against an internal rib 5 in the hub 3 of the wheel. The cooperating cones 6 or inner bearing members of said conical roller bearings are mounted on the pivot pin, conical rollers 7 being interposed between the cups and cones. A sleeve 8 on each end portion of the pivot pin abuts against a bearing cone 6 and shims 9 are interposed between said sleeves and nuts 10 mounted on the ends of the pivot pins. Frame members 11 are mounted on said sleeves.

The outer end of the hub 3 of each sheave wheel 1 is closed by a ring 12 that is secured to the the end of the hub, as by countersunk screws 13. Lubricant passageways 14 extend through the hub of each wheel into the bore thereof to permit the entrance of lubricant into the bore for said roller bearings. Said passageways are preferably closed by plugs 15.

If closure rings similar to said outer closure rings 12 were used at the inner or meeting ends of the sheave wheel hubs 3, the sheave wheels and the middle bearing cones 6 would have to be spaced apart considerably to permit installing said rings. The present invention dispenses with such independent closure members for the hubs of the two wheels and permits the sheave wheels to be arranged very close together. The cones 6 of the inner roller bearings may abut against each other. Preferably the inner edge portion 16 of the hub of each sheave wheel is rabbeted and in the annular recess of channel section formed by the two rabbets is placed a leather ring 17. Said leather ring is held in position by means of a split ring 18 or strap of spring metal that encircles said ring.

The closure construction described permits the two wheels to rotate relative to each other and at the same time prevents escape of lubricant from the hubs of the sheave wheels; thereby maintaining an adequate supply of lubricant for the roller bearings. The seal is simple and easy to apply and remove. Spacers or abutments for the inner bearing members at the meeting ends of the wheel hubs are dispensed with.

What I claim is:

1. A sheave wheel construction comprising a pivot pin, a plurality of sheave wheels thereon, the bores of adjacent wheels communicating, roller bearings interposed between said pivot pin and said sheave wheels, and an annular ring surrounding the abutting end portions of sheave wheels.

2. A sheave wheel construction comprising a pivot pin, a plurality of sheave wheels thereon, the bores of adjacent wheels communicating, roller bearings interposed between said pivot pin and said sheave wheels, an annular ring surrounding the abutting end portions of sheave wheels and a strap of spring metal encircling said ring.

3. A sheave wheel construction comprising a pivot pin, a plurality of sheave wheels thereon, the bores of adjacent wheels communicating, roller bearings interposed between said pivot pin and said sheave wheels and an annular ring of flexible material surrounding the abutting end portions of sheave wheels.

4. A sheave wheel construction comprising a pivot pin, a pair of sheave wheels thereon, the bores of adjacent wheels communicating, roller bearings interposed between said pivot pin and said sheave wheels and an annular leather ring surrounding the abutting end portions of said sheave wheels.

5. A sheave wheel construction comprising a pivot pin, a pair of sheave wheels thereon, the bores of adjacent wheels communicating, roller bearings interposed between said pivot pin and said sheave wheels, an annular leather ring surrounding the abutting end portions of said sheave wheels and a spring metal strap encircling said leather ring.

6. A construction of the kind described comprising a pivot pin, wheel members thereon having hub portions in close proximity to each other, the bores of adjacent wheels communicating, closures for the outer ends of said hub portions, conical roller bearings interposed between said wheels and said pivot pin, the adjacent edges of the hub portions of said wheels being rabbeted, and an annular flexible ring disposed in the channel formed by said rabbets.

7. A construction of the kind described comprising a pivot pin, wheel members thereon having hub portions in close proximity to each other, the bores of adjacent wheels communicating, closures for the outer ends of said hub portions, conical roller bearings interposed between said wheels and said pivot pin, the adjacent edges of the hub portions of said wheels being rabbeted, an annular flexible ring disposed in the channel formed by said rabbets and a strap of spring metal surrounding said annular ring.

8. A construction of the kind described comprising a pivot pin, wheel members thereon having hub portions in close proximity to each other, the bores of adjacent wheels communicating, conical roller bearings interposed between said wheels and said pivot pin, the adjacent edges of the hub portions of said wheels being rabbeted, an annular ring disposed in the channel formed by said rabbets and a strap of spring metal encircling said annular ring.

9. A construction of the kind described comprising a pivot pin, two wheel members thereon having hub portions in close proximity to each other, the bores of adjacent wheels communicating, conical roller bearings interposed between said wheels and said pivot pin, the inner bearing members in the meeting ends of said wheels abutting against each other, means for securing in position the inner bearing members at the ends of said pivot pin, the adjacent edges of the hub portions of said wheels being rabbeted, an annular ring disposed in the channel formed by said rabbets and a strap of spring metal encircling said annular ring.

10. A sheave wheel construction comprising frame members, a pivot pin mounted in said frame members and projecting therebeyond at its ends, a plurality of sheave wheels mounted on said pivot pin, the hub portion of each sheave wheel having an annular rib around the middle of its inner periphery, conical bearing cups in the bores of said sheave wheels seated against said ribs, bearing cones on said pivot pin and conical rollers interposed between said cups and cones, lock nuts on the projecting ends of said pivot pin, spacer sleeves on said pivot pin between the endmost bearing cones and said lock nuts, shims between said lock nuts and said sleeves, the hubs of said sheave wheels having lubricant passageways, adjacent edges of said hub portions being rabbeted, an annular flexible ring disposed in the channel thus formed and closure rings secured to the outer ends of said hub portions and encircling said spacer sleeves.

11. A sheave wheel construction comprising a pivot pin, a plurality of sheave wheels thereon, the bores of adjacent wheels communicating, bearings interposed between said pivot pin and said sheave wheels and an annular ring surrounding the abutting end portions of the sheave wheels.

12. A construction of the kind described comprising a pivot pin, wheel members thereon having hub portions in close proximity to each other, the bores of adjacent wheels communicating, closures for the outer ends of said hub portions, bearings interposed between said wheels and said pivot pin, the adjacent edges of the hub portions of said wheels being rabbeted, an annular flexible ring disposed in the channel formed by said rabbets and a strap of spring metal surrounding said annular ring.

Signed at Milwaukee, Wisconsin, this 29th day of March, 1927.

GEORGE W. CURTIS.